US011280521B2

(12) United States Patent
West et al.

(10) Patent No.: US 11,280,521 B2
(45) Date of Patent: *Mar. 22, 2022

(54) OPTIMIZED TRUSS FOUNDATIONS, ADAPTERS FOR OPTIMIZED TRUSS FOUNDATIONS AND RELATED SYSTEMS AND METHODS

(71) Applicant: Ojjo, Inc., San Rafael, CA (US)

(72) Inventors: Jack West, San Rafael, CA (US); Charles Almy, San Rafael, CA (US)

(73) Assignee: Ojjo, Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,731

(22) Filed: May 5, 2020

(65) Prior Publication Data

US 2020/0256586 A1  Aug. 13, 2020

Related U.S. Application Data

(63) Continuation of application No. 16/413,551, filed on May 15, 2019, now Pat. No. 10,670,303.

(60) Provisional application No. 62/745,188, filed on Oct. 12, 2018.

(51) Int. Cl.
| | |
|---|---|
| *E04D 13/18* | (2018.01) |
| *F24S 25/617* | (2018.01) |
| *H02S 20/32* | (2014.01) |
| *F24S 25/13* | (2018.01) |
| *F24S 30/425* | (2018.01) |
| *F24S 30/00* | (2018.01) |

(52) U.S. Cl.
CPC ............ *F24S 25/617* (2018.05); *F24S 25/13* (2018.05); *F24S 30/425* (2018.05); *H02S 20/32* (2014.12); *F24S 2030/15* (2018.05)

(58) Field of Classification Search
CPC ....... F16B 2/12; F16B 9/023; F24S 2025/802; F24S 25/70; F24S 25/12; F24S 25/632; F24S 25/20; F24S 25/636; F24S 25/65; H02S 20/24; H02S 20/10; H01L 31/042; Y10T 24/44043; Y02B 10/20; Y02B 10/12; Y02E 10/47
USPC .......... 52/173.3; 136/244; 126/600; 248/237
See application file for complete search history.

(56) References Cited

U.S. PATENT DOCUMENTS

| | | | | |
|---|---|---|---|---|
| 6,076,770 A | * | 6/2000 | Nygren | B64G 9/00 244/159.5 |
| 6,665,990 B1 | ‡ | 12/2003 | Cody et al. | E02D 27/12 52/395 |
| 8,511,021 B2 | ‡ | 8/2013 | Salisbury | |

(Continued)

FOREIGN PATENT DOCUMENTS

EP    1795829 A2 ‡ 6/2007

*Primary Examiner* — Chi Q Nguyen
(74) *Attorney, Agent, or Firm* — Phillip D. Mancini

(57) ABSTRACT

An A-frame shaped truss foundation system for a single-axis tracker with moderately sloped legs that translate lateral loads into tension and compression without substantially increasing the magnitude of the lateral load force while optimizing material usage. Several such truss foundation systems are installed in a row to support a torque tube of a single-axis solar tracker. An adapter joins ends of adjacent upper legs and separates the truss legs by an angle more than 35-degrees up to 70-degrees. In some cases, the adapter may have an integrated bearing.

18 Claims, 16 Drawing Sheets

(56) References Cited

U.S. PATENT DOCUMENTS

| | | | |
|---|---|---|---|
| 8,609,977 B2 ‡ | 12/2013 | Jone et al. | ............ H01L 31/042 |
| | | | 136/246 |
| 8,776,781 B2 ‡ | 7/2014 | Meydbray | ............... H01L 31/00 |
| | | | 126/655 |
| 8,991,388 B2 * | 3/2015 | Brothersen | ............... E04C 3/09 |
| | | | 126/680 |
| 9,057,546 B2 ‡ | 6/2015 | Sade | ....................... F24J 2/5413 |
| | | | 126/569 |
| 9,207,000 B2 ‡ | 12/2015 | Kruse | |
| 9,534,386 B2 * | 1/2017 | Brothersen | ............. H02S 20/10 |
| 10,615,739 B2 * | 4/2020 | West | ....................... H02S 20/10 |
| 10,670,303 B2 * | 6/2020 | West | ....................... F24S 25/65 |
| 2008/0029148 A1 * | 2/2008 | Thompson | ............ F24S 30/425 |
| | | | 136/244 |
| 2009/0260316 A1 * | 10/2009 | Jones | .................... F24S 25/617 |
| | | | 52/745.21 |
| 2013/0048582 A1 * | 2/2013 | Kruse | .................. F24S 30/425 |
| | | | 211/41.1 |
| 2014/0076380 A1 * | 3/2014 | Kalus | ................ H01L 31/0547 |
| | | | 136/246 |
| 2014/0090707 A1 * | 4/2014 | Almogy | .................. F24S 23/74 |
| | | | 136/259 |
| 2016/0013751 A1 ‡ | 1/2016 | Michotte | |
| 2018/0051915 A1 ‡ | 2/2018 | Rainer | |
| 2020/0313602 A1 * | 10/2020 | West | ....................... F24S 25/65 |

\* cited by examiner
‡ imported from a related application $\theta = 77.5°$
$\alpha = 25°$ IF $F_L = 2500$lb
$F_T/F_C = \dfrac{2500}{2 \cdot \cos(\theta)}$
$F_T/F_C = 5775$lb $\theta = 82.5°$
$\alpha = 15°$ IF $F_L = 2500$lb
$F_T/F_C = \dfrac{2500}{2 \cdot \cos\theta}$
$F_T/F_C = 9576$lb

OPTIMIZED TRUSS FOUNDATIONS, ADAPTERS FOR OPTIMIZED TRUSS FOUNDATIONS AND RELATED SYSTEMS AND METHODS

CROSS-REFERENCE TO RELATED APPLICATIONS

This is a continuation of U.S. utility patent application Ser. No. 16/413,552 filed May 15, 2019, now U.S. Pat. No. 10,670,303, entitled "OPTIMIZED TRUSS FOUNDATIONS, ADAPTERS FOR OPTIMIZED TRUSS FOUNDATIONS, AND RELATED SYSTEMS AND METHODS," which claims priority to U.S. provisional patent application No. 62/745,188 filed on Oct. 12, 2018, titled "OPTIMIZED A-FRAME FOUNDATIONS FOR AXIAL SOLAR ARRAYS AND RELATED SYSTEMS AND METHODS", the disclosures of which are hereby incorporated by reference in their entirety.

BACKGROUND

Solar energy is one of Earth's largest potential sources of energy. Above the atmosphere, solar irradiance per unit area is 1.361 kilowatts per square meter. At sea level, the usable energy density is reduced to 250 watts per square meter. Using a two-dimensional model to approximate the Earth, 250 watts/square meter*$\pi$*6,371,000 meters$^2$ yields about 32,000 terra (trillion) watts of energy that continuously strikes Earth's surface. Assuming the sun continues to burn and emit photons for a billion more years, the survival of human life ultimately depends on harnessing this essentially unlimited, source of clean energy.

The main impediment to widescale solar adoption thus far has been cost. Unlike other energy sources, solar energy costs are frontloaded while the operating costs are comparatively low. Fossil fuel-based energy sources require up-front costs as well as pay-as-you-go costs from consuming fuel. Unfortunately, not all the ongoing costs are reflected in the price of energy generated from fossil-fuel sources. These "dirty" energy sources have significant external costs stemming from $CO_2$ emissions that, in the absence of a carbon tax, are not reflected in the cost. In addition to this cost advantage, entrenched utilities and fossil fuel producers have lobbied effectively to stymie the progress of solar, even in states with the greatest solar potential.

Notwithstanding these headwinds, the cost of solar has now dropped low enough that even when coupled with energy storage, solar power is equivalent to or less expensive than power generated from coal, oil and even natural gas. In the context of the electricity market, the relative cost difference between competing sources is quantified in terms of the cost per unit, typically a kilowatt hour (kWh). Large scale solar arrays, so called "utility-scale" arrays, may have tens to hundreds of megawatts of power generating capacity, putting them on the same scale as small coal and natural gas-fueled power plants. These arrays generate power that is fed into the grid and sold at wholesale prices on the order of a few cents per kWh.

The development of utility-scale solar projects is typically funded against power purchase agreements (PPAs). With a PPA, an off-taker (e.g., utility, grid operator, etc.) agrees to purchase all the power generated by the system at a fixed rate for the operational life of the array (e.g., 30 years). This enables a bank or other investor to accurately value the future revenue stream and to loan money against it to finance construction of the array.

Utility-scale solar power plants are predominantly configured as fixed-tilt ground mounted arrays or single-axis trackers. Fixed-tilt arrays are arranged in East-West oriented rows of panels tilted South at an angle dictated by the latitude of the array site—the further away from the equator, the steeper the tilt angle. By contrast, single-axis trackers are installed in North-South rows with the solar panels attached to a rotating axis called a torque tube that moves the panels from an East-facing orientation to a West-facing orientation throughout the course of each day, following the sun's progression through the sky. For purposes of this disclosure, both fixed-tilt and single-axis trackers are referred to collectively as axial solar arrays.

Excluding land acquisitions costs, overall costs for building utility-scale arrays include site preparation (road building, leveling, grid and water connections etc.), foundations, tracker or fixed-tilt hardware, solar panels, inverters and electrical connections (conduit, wiring, trenching, grid interface, etc.). Many of these have come down in price over the past few years due to ongoing innovation and economies of scale, however, one area that has been largely ignored is foundations. Foundations provide a uniform structural interface that couples the system to the ground. When installing a conventional single-axis tracker, after the site has been prepared, plumb monopiles are usually driven into the ground at regular intervals dictated by the tracker manufacturer and/or site plan; the tracker system components are subsequently attached to the head of those piles. Most often, these monopiles have an H-shaped profile, but they may also be C-shaped or even box-shaped. In conventional, large-scale single-axis tracker arrays, the procurement and construction of the foundations may represent up to 5-10 percent of the total system cost. Despite this relatively small share of the total cost, any savings in steel and labor associated with foundations will amount to a significant amount of money over a large portfolio of solar projects. Also, tracker development deals are often locked-in a year or more before the installation costs are actually incurred, so any post-deal foundation savings that can be realized will be on top of the profits already factored into calculations that supported the construction of the project.

One reason monopiles continue to dominate the market for single-axis tracker foundations is simplicity. It is relatively easy to drive monopiles into the ground along a straight line with existing technology even though their design is inherently wasteful. The physics of a monopile mandates that it be oversized because single structural members are not good at resisting bending forces. When used to support a single-axis tracker, the largest forces on the foundation are not from the weight of the components, but rather the combined lateral force of wind striking the solar panels. This lateral force gets translated into the foundation as a bending moment. The magnitude of the bending moment is much greater than the static loading attributable to the weight of the panels and tracker components. It acts like a lever arm trying to bend the pile, and the longer the lever arm, the greater the magnitude of the force. Many tracker companies specify a minimum foundation height of 40-inches or more. Therefore, in the context of single-axis trackers, monopile foundations must be oversized and driven deeply into the ground to withstand lateral loads.

One proposed alternative to monopile foundations is to use a pair of steeply angled legs to form an A-frame or truss-like foundation. An A-frame has the advantage of converting lateral loads into axial forces of tension and compression in the legs. As an example, this is seen in published U.S. Patent Application, 2018/0051915 (herein after, "the '915 application"). The '915 application teaches a support device for solar panels that consists of a pair of ground screws driven into the ground either parallel or at steep angles to one another and joined above ground with a bridge. According to the disclosure, in the angled embodiments, the legs are inclined towards one another at an angle that is preferably between 10 and 35-degrees, and more preferably between 15 and 25-degrees. That angle is the separation of the legs at the apex of the A-frame and corresponds to a leg angle in a range of ±72.5-degrees to ±85-degrees and more preferably ±78.5-degrees to ±82.5-degrees with respect to horizontal. As discussed in greater detail herein, such steep angles, while still capable of translating lateral loads into tension and compression, will result in tensile and compressive forces much larger than the underlying lateral load. The magnitude of the tensile and compressive forces generated by lateral loads is non-linearly correlated to leg angle, a fact that is not recognized by the teaching of the '915 application. As a result, at such steep angles, the legs must be oversized or include additional orthogonal features to resist the large values of tension and compression that are generated. Otherwise, the foundation will fail. This is part of the reason why ground screw-based A-frames have failed to gain traction in the utility scale solar industry, other than in the most difficult soils where costly refusals dominate.

In recognition of this problem, it is an object of various embodiments of this disclosure to provide a truss or A-frame foundation for single-axis trackers that is limited to a range of angles that reduces the non-linear magnitude of tensile and compressive forces imparted to the truss from lateral loads and thereby optimizes the amount of steel and depth of embedment needed for a given diameter leg.

DETAILED DESCRIPTION

The following description is intended to convey a thorough understanding of the embodiments described by providing a number of specific embodiments and details involving A-frame foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1A:
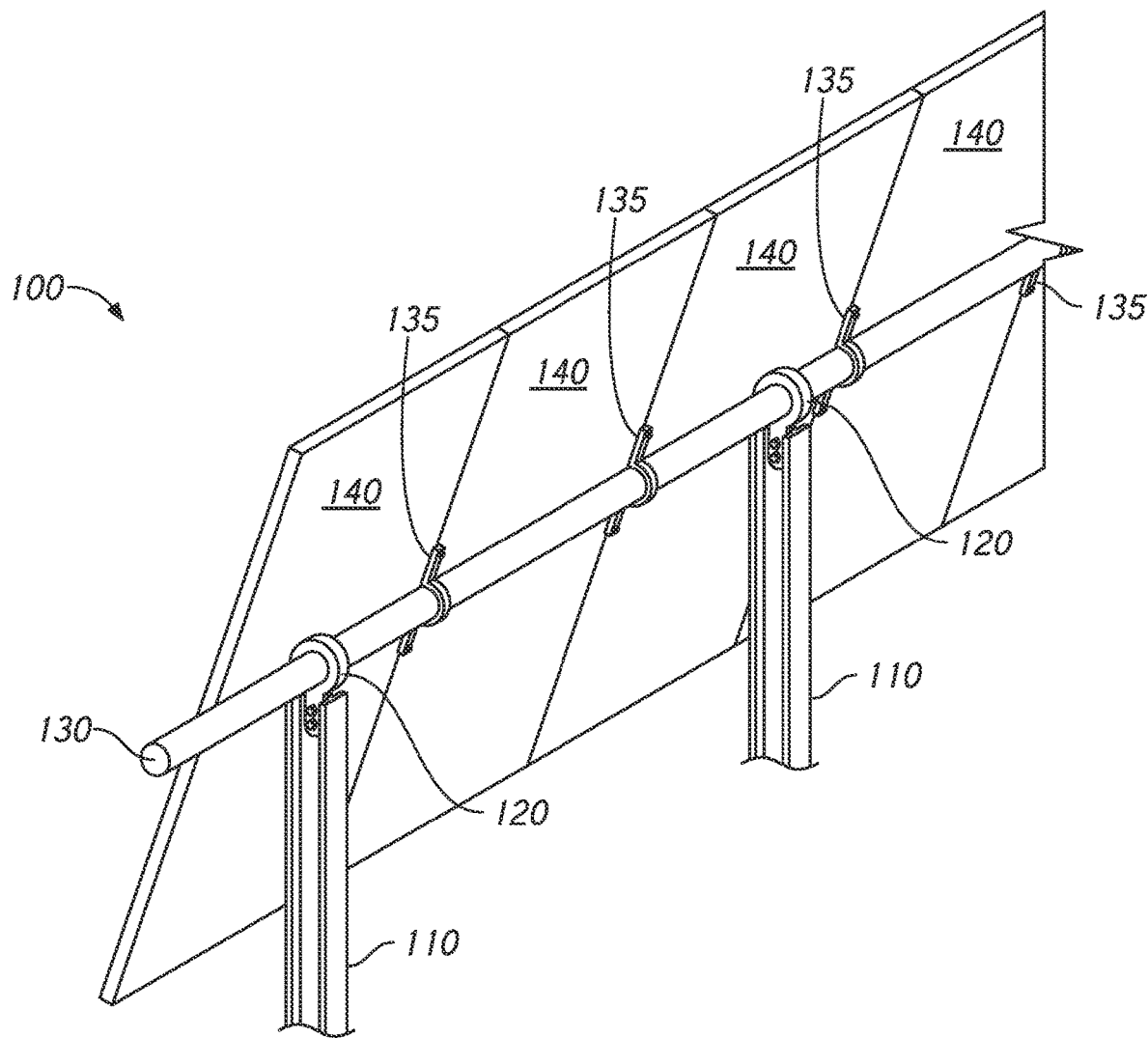
FIG. 1A shows a portion of an exemplary single-axis tracker system supported by multiple conventional monopile foundations.

As discussed in the background, when a single-axis tracker is supported by monopile foundations, lateral loads induced by wind striking the array generate large bending moments that must be resisted by the foundation. FIG. 1A shows a portion of single-axis tracker 100 supported by a series of aligned monopile foundations 100. Exemplary tracker 100 in this figure consists of solar panels 140, attached to torque tube 130 via panel brackets 135. Torque tube 130 is captured within multiple aligned cylindrical bearing assemblies 120 that are each attached atop respective H-piles 110. Though not shown, one pile will also typically support a drive motor or gear assembly that moves the torque tube. Also, electrical interconnections between the solar panels have been intentionally omitted. In real world conditions, the panels would be connected serially to form high voltage direct current (DC) strings that are fed into one or more combiner boxes and/or inverters.

Single-axis tracker 100 shown in FIG. 1 is a conventional bottom-up design where the bearing assembly is attached the head of the pile and the torque tube rotates within the bearing about its own main axis. Other tracker systems may employ a top-down design where the torque tube hangs from a hinge received in the bearing housing so that the torque tube can sweep through an arc like a pendulum. In such systems, the drive motor is offset from the torque tube's main axis so that the tracker's axis of rotation is about the hinge point. The bearing housing is still attached to the head of each pile, but the axis of rotation is offset from the torque tube's main axis. One such top-down tracker is disclosed, for example, in U.S. Pat. No. 10,222,446, which is hereby incorporated by reference in its entirety. The various embodiments of the invention are compatible with bottom-up as well as top-down or off-set single-axis trackers.

Figure 1B:
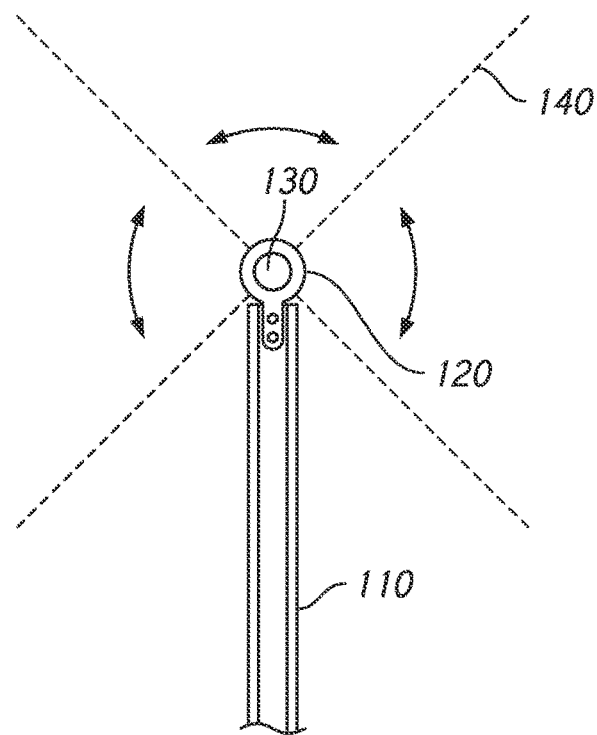
FIG. 1B is an end view of the system of FIG. 1A showing the range of angles of the solar panels as the torque tube rotates.

FIG. 1B is an end view of the portion of the conventional tracker shown in FIG. 1A. The Figure shows foundation pile 110, bearing assembly 120 and torque tube 130. Rotation of torque tube 130 causes solar panels 140 to sweep through a range of angles from East to West shown by the dotted lines in the figure. The extent of angular rotation is specified by the tracker maker but currently as much as ±55-degrees to ±60-degrees with respect to horizontal (0-degrees). Because the pile is plumb (i.e., oriented at 90-degrees), there is ample clearance for the panels to achieve their maximum rotation angle without mechanical interference from the foundation.

Figure 1C:
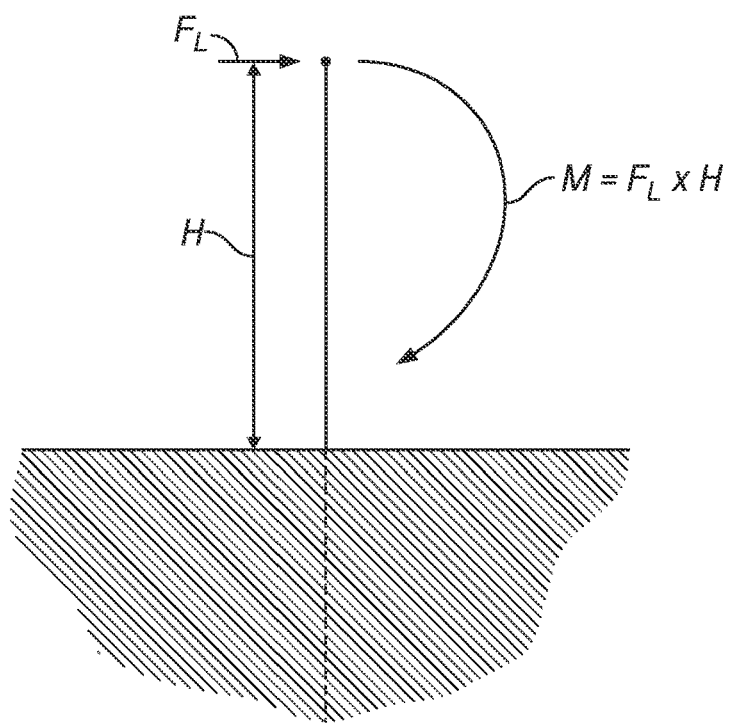
FIG. 1C is a force diagram showing how lateral loads are translated into a bending moment in a conventional monopile foundation of FIG. 1A.

FIG. 1C is a force diagram showing the effect of lateral loads on such a tracker. Lateral load $F_L$ imparts a bending moment on the foundation at the point where the torque tube is attached to the pile (e.g., at the bearing assembly). The magnitude of the resulting moment M is equivalent to the magnitude of the force $F_L$ multiplied by the height H above the point where the foundation is pinned to the ground. If the pile extends four feet above ground and the lateral load is 2,500 pounds, the resultant moment M will be at least 2500×4 or 10,000 lb./ft. The pin point will often be more than one foot below ground because the top layer of soil provides little resistance to moments so the safety factor of the pile must be increased to account for that reality. Therefore, to achieve the necessary structural rating, the piles used to support the array must be rated to resist that moment and driven deep enough to keep it pinned when subjected to such a moment. This requires the use of a strong monopile, such as a the commonly used W6×9 or W6×12 H-pile, which have a six-inch flange and nine or twelve pounds of steel per linear foot respectively, with as much as five to seven feet of below ground embedment.

The inventors and applicant of this disclosure have proposed an alternative to plumb monopile foundations that aims to significantly reduce the total amount of steel required to support axial solar arrays. This alternative foundation system, referred to commercially as EARTH-TRUSS™, consists of a pair of moderately sloped, substantially aligned legs configured as an A-frame or truss that extend above and below ground and are joined at the apex with an adapter, bearing assembly, or other torque tube support element. The truss architecture offers several advantages over conventional monopiles foundations. First, if properly designed, the A-frame will translate lateral loads into axial forces of tension and compression in the legs rather than bending. Individual structural members are poor at resisting bending but relatively good at resisting axial forces. The A-frame or truss takes advantage of this by directing those forces along the axis of the legs where it is best applied. Therefore, the size and gauge of the steel that makes up the legs may be much smaller than an equivalent monopile. Also, without needing to resist bending, the legs do not need to be driven as deep as a conventional monopiles. This saves steel but also reduces the likelihood of encountering a refusal. A refusal occurs when additional impacts of a pile driver fail to result in additional embedment of the pile. Usually, this is the result of striking rock or cementious soil and requires an expensive, labor-intensive mitigation process. The shallower piles are driven, the less likely it is that they will encounter rock or cementious soil.

Figure 2A:
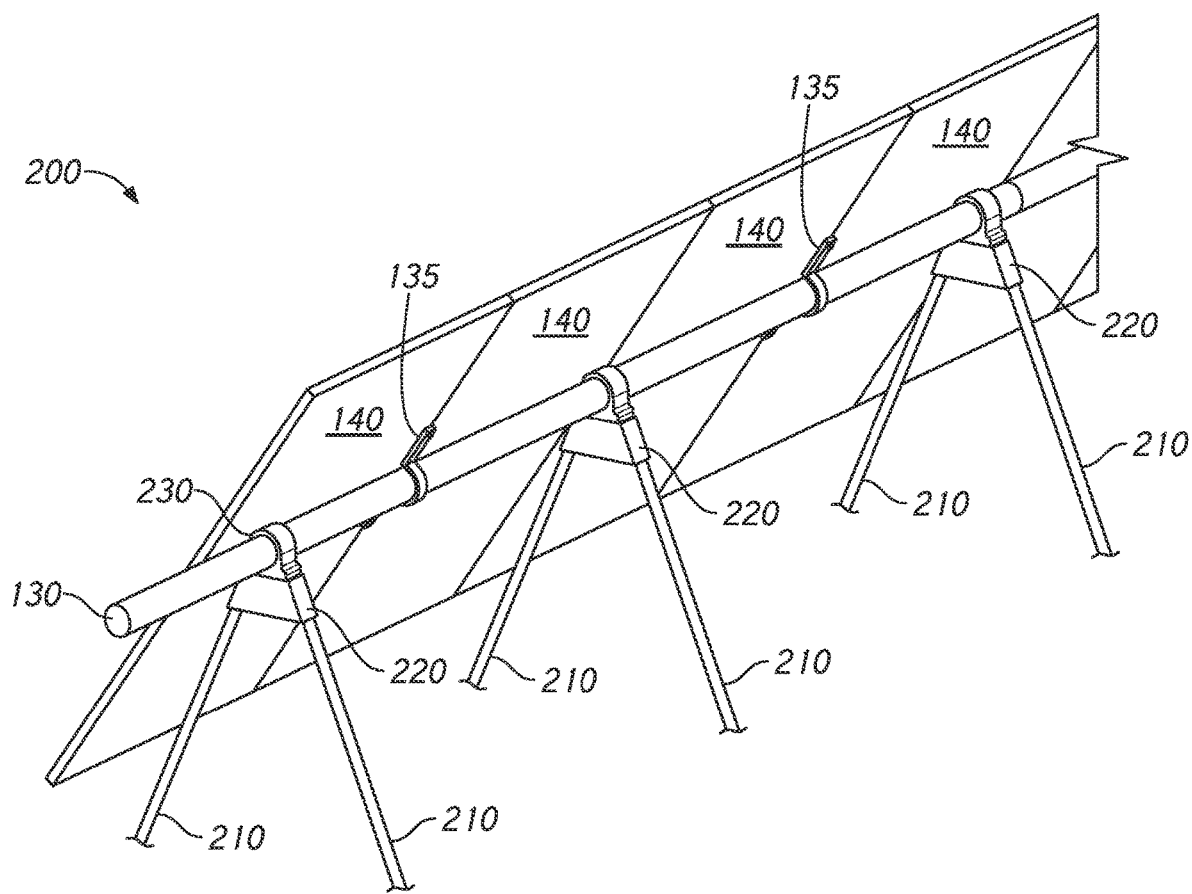
FIG. 2A shows a portion of an exemplary single-axis tracker system supported by a moderately sloped A-frame foundation.

Turning now to FIG. 2A, this figure shows a single-axis tracker like that of FIG. 1A, except that the monopile foundations have been replaced with multiple aligned A-frame or truss foundations 200. Each truss foundation 200 consists of a pair of adjacent legs 210 driven into the ground at angles to each other so that they are substantially aligned with each other. In various embodiments, the legs may be angled symmetrically (e.g., ±60-degrees) with respect to horizontal. In other cases, they may be at somewhat different angles due to variations in grade and terrain and misalignment during driving. Surface variations can make measurement of the legs with respect to grade or a horizontal reference difficult. Therefore, throughout the disclosure, A-frame or truss foundations are characterized in terms of their top angle, even though this implies a corresponding leg angle.

In various embodiments, legs 210 may be beaten into the ground with a pile driver, rotated into the ground with a rotary driver, pushed into the ground, or otherwise driven. Also, legs 210 may consist of a single member or multiple interconnected members extending along a substantially common axis. Truss foundations 200 are installed along a North-South row at regular intervals specified by the tracker maker. In this exemplary system, the above ground ends of each leg 210 are joined by adapter 220. As shown, bearing assembly 230 sits atop adapter 220. Torque tube 130 passes orthogonally through each bearing assembly 230. It should be appreciated that in other embodiments, and as discussed in greater detail herein, the bearing assembly and adapter may be combined into a single structure to reduce part count, cost and for other reasons.

Figure 2B:
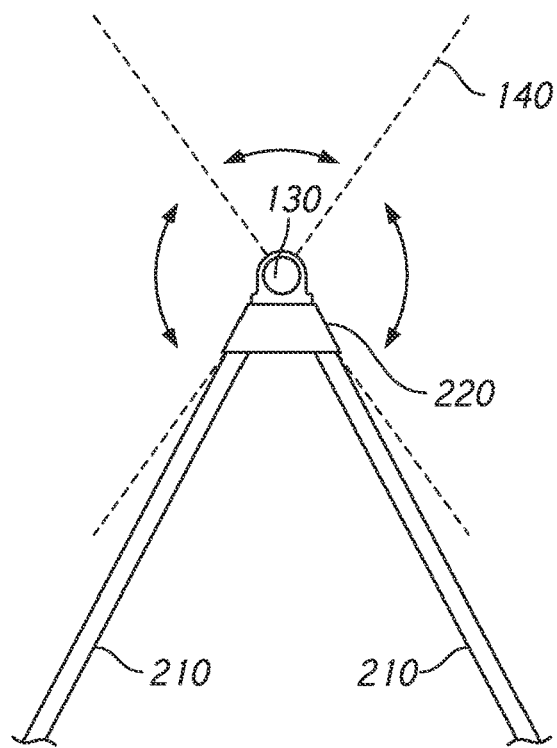
FIG. 2B is an end view of the system of FIG. 2A showing the range of angles of the solar panels as the torque tube rotates.

FIG. 2B is an end view of tracker system 200 of FIG. 2A. As seen in this figure, clearance between the panels and the foundation is tighter than in the case of the monopile array of FIGS. 1A and B due to angled legs 210. If the tracker can orient the panels all the way down to ±60-degrees, the legs may have to be separated by a smaller top angle to prevent interference. It is not uncommon for the angle of panels on a torque tube to vary along its length by as much as 5-degrees due to bending and manufacturing tolerances, so an additional buffer of 5-degrees may be necessary to avoid interference.

Figure 2C:
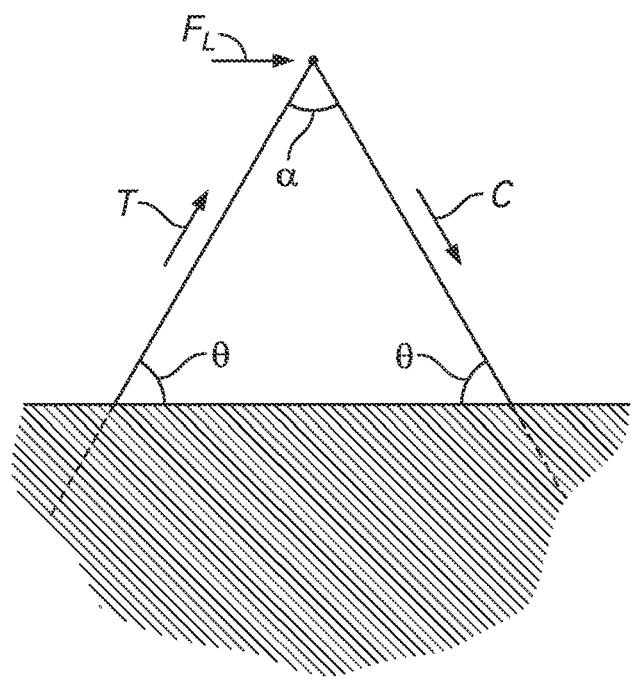
FIG. 2C is a force diagram showing how lateral loads are translated into tension and compression in the moderately sloped A-frame foundation of FIG. 2A.

FIG. 2C is a force diagram showing how lateral loads are translated in a truss or A-frame foundation. As discussed herein, the truss architecture directs lateral forces along the main axis of each structural member instead of trying to bend them. In general, the column loading capacity of the legs is much greater than the tensile and compressive forces generated by lateral loads so loading capacity is not the limiting factor. Rather, a combination of skin friction between the leg surface and the soil and resistance from orthogonal threads or other below-ground features will control the truss' ability to resist lateral loads. If designed properly, the primary failure mode should be pulling up on the windward leg and sinking of the leeward leg. As seen in 2C, when lateral load $F_L$ strikes the array, the forces are translated into the truss legs as tension and compression labeled T and C. For the truss not to fail, the sum of all forces must be zero. In this case, that means that the sum of forces in the direction of the lateral load, labeled X direction in the figure, must be zero. In other words, the X-component of the resistance provided by the legs to the lateral load, labeled as $F_{T/C}$, must be equivalent to the lateral load $F_L$. The actual value of these forces will also be impacted by the vertical load from the weight of the tracker system, which will resist tension in the windward leg and add to compression in the leeward leg, however, for purpose of angle comparison that load has been ignored. The X-component of resistive forces $F_{T/C}$ is proportional to the cosine of the truss leg angle θ by equation (1):

$$F_L = 2F_{T/C} \cos(\emptyset) \quad (1)$$

Therefore, the required resistive force for each leg $F_{T/C}$ in response to $F_L$ is equal to $$\frac{F_L}{2\cos(\emptyset)}.$$

As θ approaches 90-degrees, the cos(θ) will approach zero and the required resistive force $F_{T/C}$ in each leg will approach infinity.

Figure 3A:
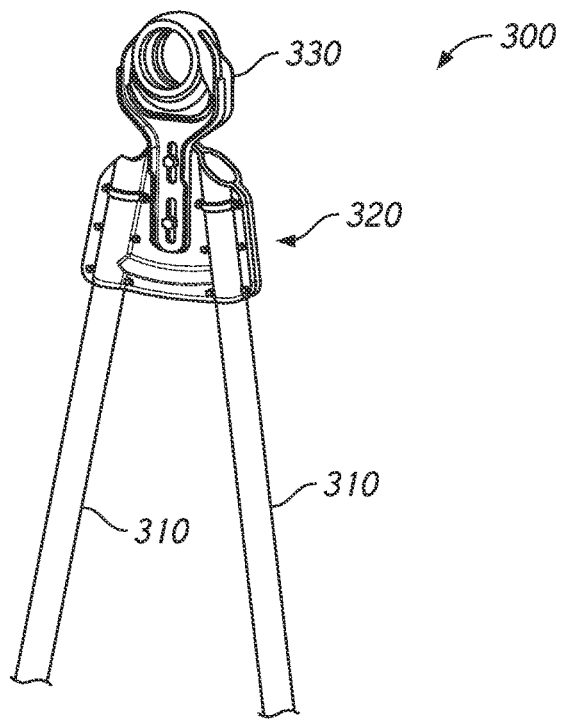
FIG. 3A shows a portion of a single-axis tracker system supported by a conventional steeply sloped A-frame foundation.
Figure 3B:
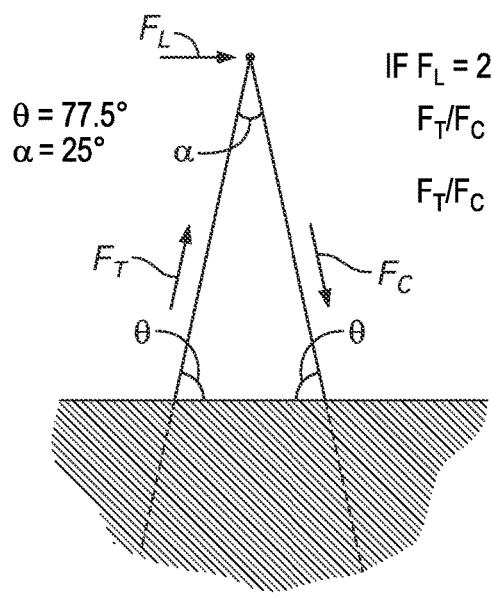
FIG. 3B is a force diagram showing the magnitude of tensile and compressive forces in the steeply sloped A-frame of 3A at 77.5-degrees in response to a 2,500-pound lateral load.
Figure 3C:
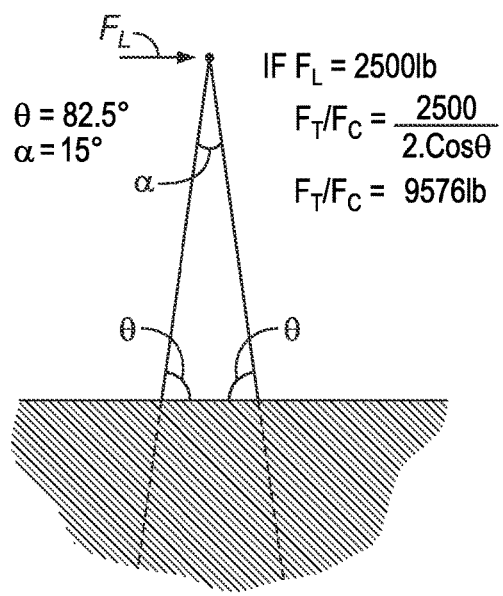
FIG. 3C is a force diagram showing the magnitude of tensile and compressive forces in the steeply sloped A-frame of 3A at 82.5-degrees in response to a 2,500-pound lateral load.
Figure 3D:
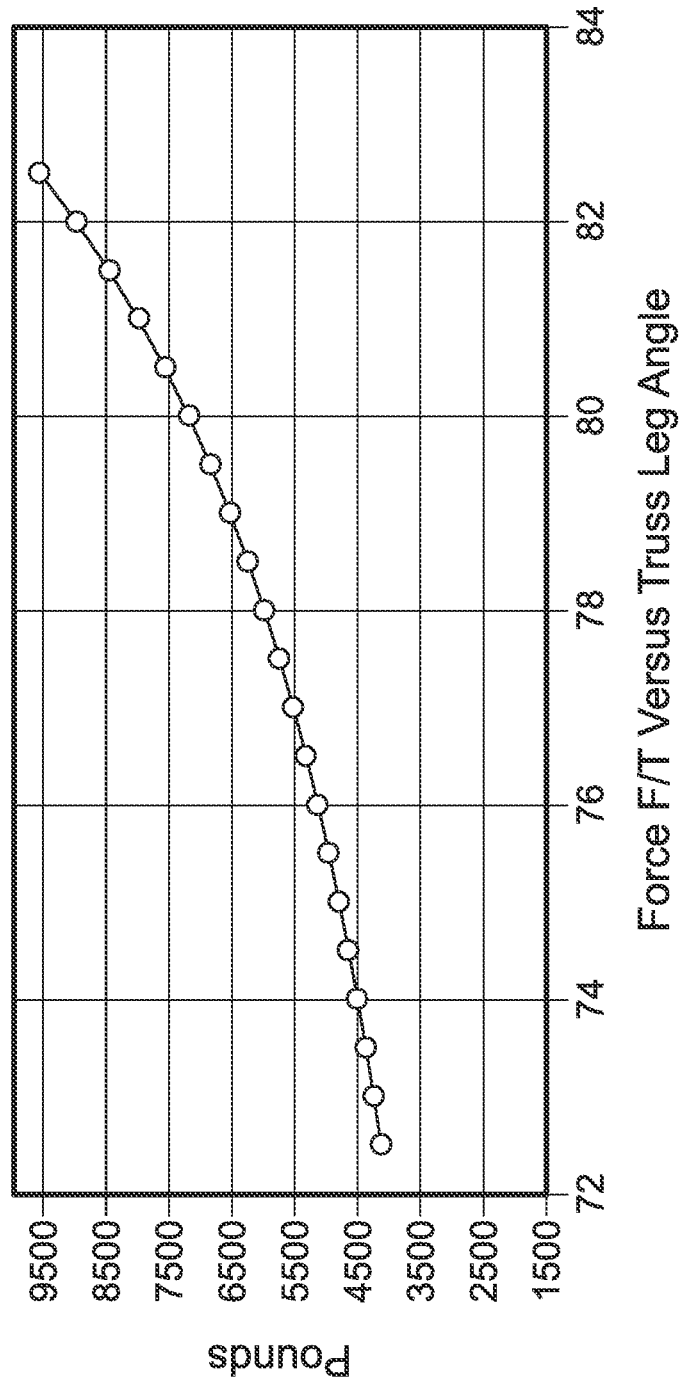
FIG. 3D is a graph of tensile and compressive forces through a range of steep angles for a 2,500-pound lateral load.

As discussed in the background above, the '915 application teaches one example of an A-frame or truss foundation used to support a single-axis tracker. FIG. 3A is a reproduction of the foundation described in the '915 application. System 300 consists of a pair of angled legs 310, in this case ground screws, joined above ground by a two-piece bridge that clamps down on the end of each leg. A conventional bearing assembly 330 is bolted onto the bridge to complete the assembly. The disclosure describes a range for the top angle α between each leg that is preferably between 10 and 35-degrees, and more preferably between 15 and 25-degrees. These ranges for the angle α correspond to truss legs that are angled in a range of ±72.5-degrees to ±85-degrees (assuming they are symmetric with respect to horizontal), and more preferably truss leg angles θ of ±77.5-degrees to ±82.5-degrees. FIGS. 3B and 3C are force diagrams showing the magnitude of the required $F_{T/C}$ at the steep leg angles and corresponding small apex angles suggested in the '915 application for a 2,500-pound lateral load. Starting with 3B, the chosen angle α is 25-degrees corresponding to a leg angle θ=77.5-degrees, the high end of the preferred range for α specified in the '915 application. The resistive force required in each leg $F_{T/C}$ is equal to 5,775 pounds or 2500/2*Cosine (77.5). Although still under the column capacity of the leg, this results in substantially increased axial forces to be resisted with skin friction and orthogonal threads. In FIG. 3C, the apex angle α is set to 15-degrees, corresponding to a leg angle θ of ±82.5-degrees, the lower end of the '915 application's preferred range for α. At this angle, assuming the same 2,500-pound lateral load, $F_{T/C}$ increase to 9,576 pounds or 2500/2*Cosine (82.5), nearly a four-fold increase. Table 1 below shows the resistive force required in each leg ($F_{T/C}$) for the entire range of angles proposed in the '915 application. FIG. 3D is a graph of the same. The first column of Table 1 is the truss leg angle θ and ranges from 72.5-degrees to 82.5-degrees in half-degree increments. The second column is the top angle α between the legs when they are joined at the apex for each given leg angle and changes in one-degree increments. The third column is the resultant tensile and compressive forces $F_{T/C}$ that must be generated to resist the 2,500-pound lateral load.

TABLE 1

Resistive force for range of angles in '915 application.

| Angle Θ | Angle α | Force $F_{T/C}$ (lbs.) |
|---|---|---|
| 72.5 | 35 | 4157 |
| 73 | 34 | 4275 |
| 73.5 | 33 | 4401 |
| 74 | 32 | 4535 |
| 74.5 | 31 | 4677 |
| 75 | 30 | 4830 |
| 75.5 | 29 | 4992 |
| 76 | 28 | 5167 |
| 76.5 | 27 | 5355 |
| 77 | 26 | 5557 |
| 77.5 | 25 | 5775 |
| 78 | 24 | 6012 |
| 78.5 | 23 | 6270 |
| 79 | 22 | 6551 |
| 79.5 | 21 | 6859 |
| 80 | 20 | 7198 |
| 80.5 | 19 | 7574 |
| 81 | 18 | 7991 |
| 81.5 | 17 | 8457 |
| 82 | 16 | 8982 |
| 82.5 | 15 | 9577 |

As Table 1 and the corresponding graph at FIG. 3D show, the resultant force increases in a non-linear fashion in the range for a proposed in the '915 application, negating the benefits of using an A-frame or truss foundation. To resist the large tensile and compressive forces at these shallow apex angles (steep leg angles), the truss components must be overbuilt, driven deeply and/or include additional orthogonal features. This will undermine the advantages that can be provided by replacing monopiles with A-frames by making them relatively more expensive. Though not stated, module interference with the legs may be one reason for the recommended range of angles in the '915 application.

Figure 4A:
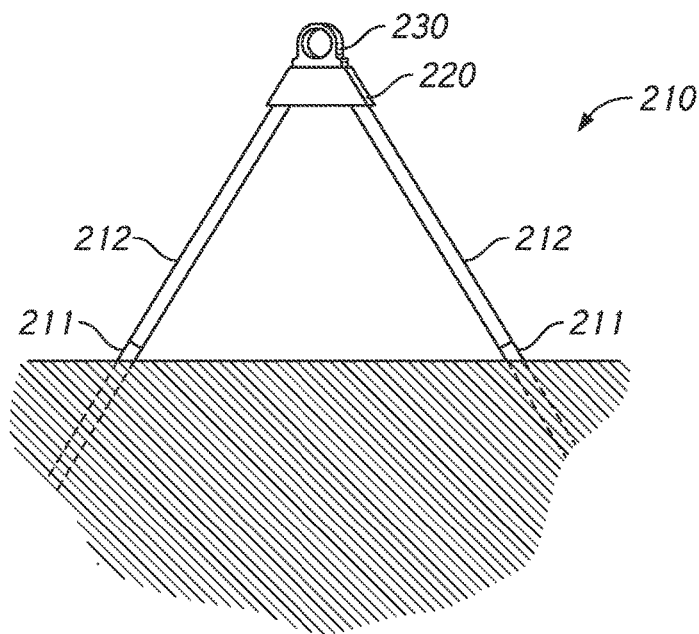
FIG. 4A is a moderately sloped A-frame foundation system according to various embodiments of the invention.

Turning now to FIG. 4A, this figure shows a truss foundation 200 for a single axis tracker according to various exemplary embodiments of the invention. The exemplary truss shown here consists of adjacent legs 210 driven into the ground to be substantially aligned with each other and along the torque tube. The significance of this is that if the legs are not substantially aligned, that is their respective axes don't extend to substantially the same place on the torque tube, lateral loads will introduce a twisting moment to the foundation in addition to tension and compression. This twisting moment will require additional reinforcing of the apex hardware to withstand these twisting forces.

Figure 11A:
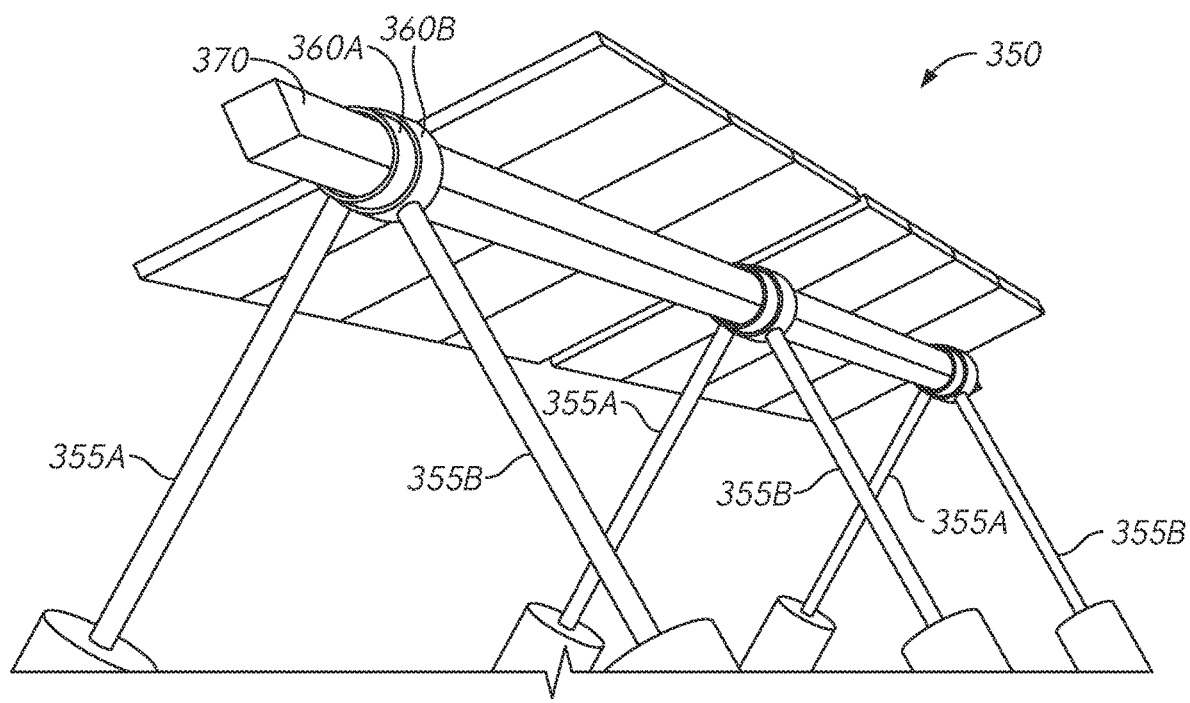
FIGS. 11A and 11B are perspective and top views respectively of a conventional single-axis tracker.
Figure 11B:
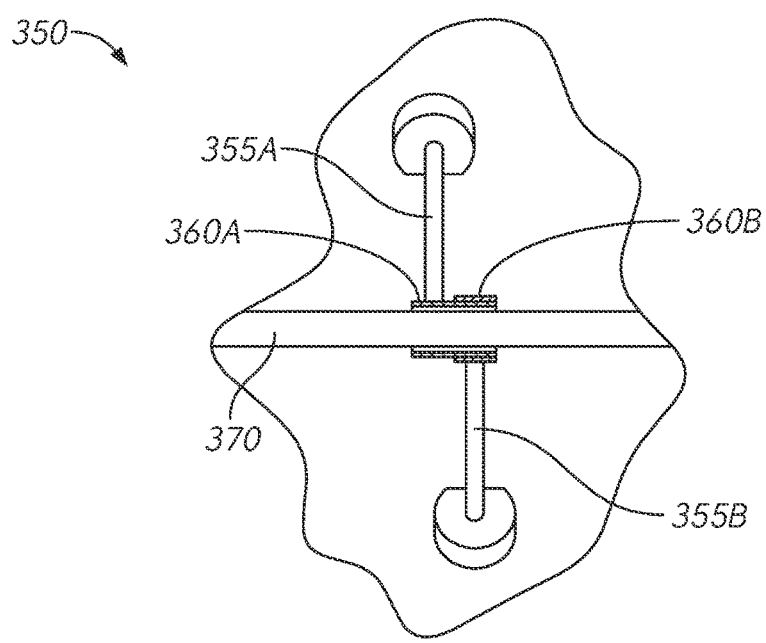

This is seen in the prior art, for example, in U.S. Pat. No. 9,207,000 (hereinafter, the '000 patent). FIGS. 11A and B, are reproduced from the '000 patent. Tracker 350 has an A-frame-shaped foundation with legs 355A/B supporting torque tube 370. The bearing assembly consists of respective bearings 360A/B welded to the top of each leg 355A/B to make them into unitary structures. The bearings are nested one within the other along torque tube 370 resulting in an offset geometry as seen in the overhead view of 11B. Because legs 355A/B are offset, that is not substantially aligned with respect to the torque tube, or symmetric with respect to each other, lateral loads will tend to twist the legs, bearings and torque tube. Tracker 350 compensates for this by nesting one bearing within the other, however, this requires a double thickness of metal at the bearing and that the legs be thicker and/or heavier than they would need to be if no twisting moment was generated.

Returning to the system of 4A, in this system, legs 210 are joined at the top by adapter 220 so that they are substantially aligned with respect to each other and the torque tube. Bearing assembly 230 sits atop adapter 220. As a result of the legs alignment, lateral loads will result in axial forces only and no twisting moment. Also, in contrast to truss 300 of FIG. 3A, truss 200 of this figure is optimized to an angle that significantly limits the tensile and compressive forces, in this case a 60-degree apex angle α and 60-degree leg angle θ. The dramatic effects of this are shown in the force diagram of 4B. Assuming the same 2,500-pound lateral load as in the force diagrams of FIGS. 3B and 3C, the forces $F_{T/C}$ in each leg drop to 2,500 pounds at 60-degrees, or 2500/2*cos(60), a 57-percent reduction over the 25-degree apex angle (77.5-degree truss leg angle) of FIG. 3B, and a staggering 74-percent reduction over the 15-degree apex angle (82.5-degree truss leg angle) of FIG. 3C.

Figure 4B:
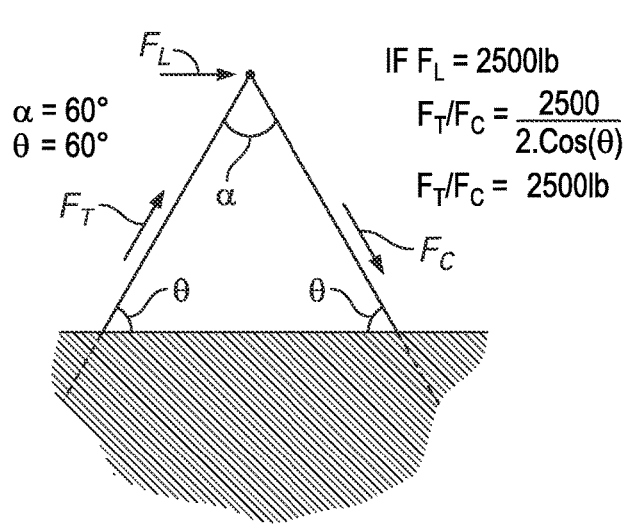
FIG. 4B is a force diagram showing the magnitude of tensile and compressive forces in the moderately sloped A-frame of 2A and 2B at ±60-degree in response to a 2,500-pound lateral load.
Figure 4C:
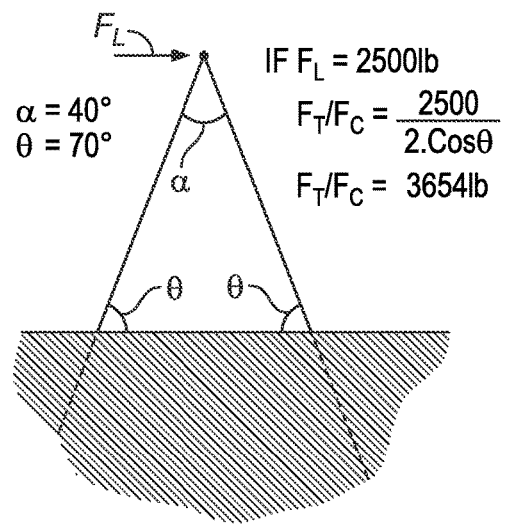
FIG. 4C is a force diagram showing the magnitude of tensile and compressive forces in the moderately sloped A-frame of 2A and 2B at ±65-degrees in response to a 2,500-pound lateral load.
Figure 4D:
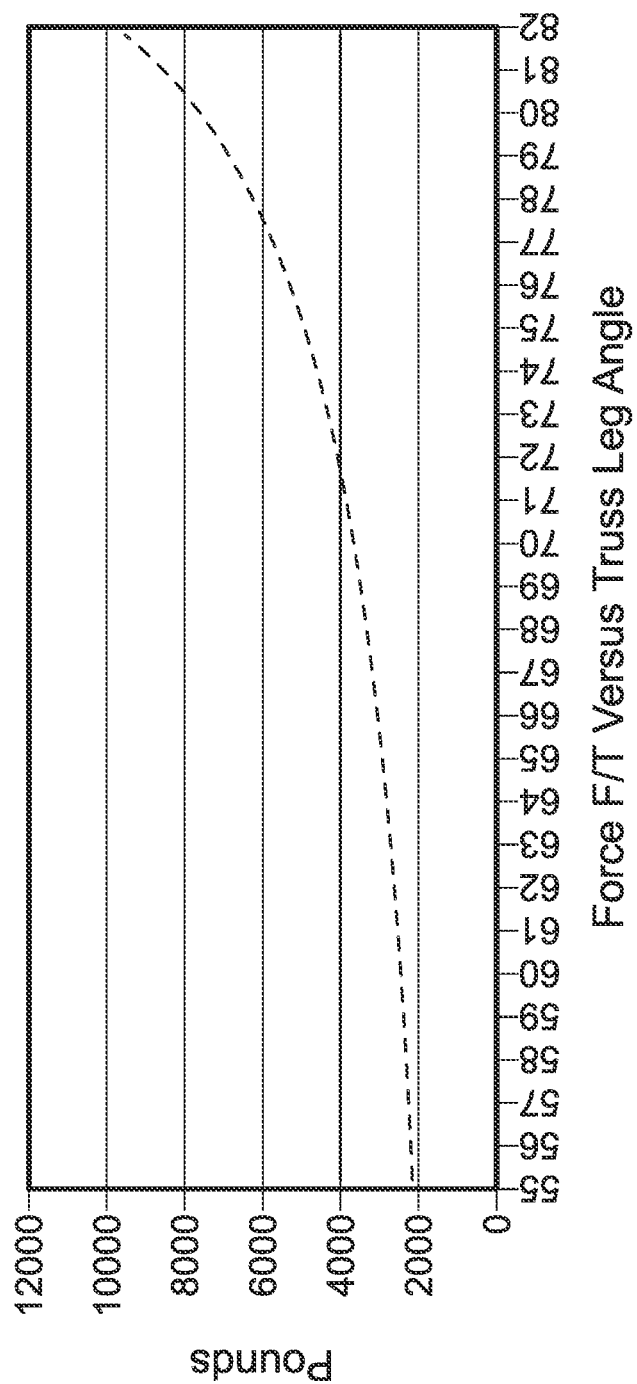
FIG. 4D is a graph of tensile and compressive forces through a range of moderately sloped and steep angles in response to a 2,500-pound lateral load.

FIG. 4C is force diagram repeating the analysis of FIG. 4B for a 30-degree apex angle (70-degree truss leg angle). Assuming the same 2,500-pound lateral load, with the legs oriented at 70-degrees, the value of the resistive force required in each leg ($F_{T/C}$) increases to 3654 pounds, or 2500/2*cos(70), a 37-percent reduction over the 25-degree apex angle (77.5-degree truss angle) of FIG. 3B and a 62-percent reduction over the 15-degree apex angle (82.5-degree truss angle) shown in FIG. 3C. Table 2 below shows the resistive force required in each leg ($F_{T/C}$) for the entire range of angles proposed by the inventors of this application. FIG. 4D is a graph of the of the data in Table 2 as well as the data in Table 1. The first column is the truss leg angle θ and ranges from 55-degrees to 72.5-degrees in half-degree increments. The second column is the apex or top angle between the legs, α, and the third column is the resultant tensile and compressive forces $F_{T/C}$ that must be generated to resist the 2,500-pound lateral load.

TABLE 2

Resistive force for range of angles according to embodiments of the invention.

| Angle Θ | Angle α | Force $F_{T/C}$ (lbs.) |
|---|---|---|
| 55 | 70 | 2179 |
| 55.5 | 69 | 2207 |
| 56 | 68 | 2235 |
| 56.5 | 67 | 2265 |
| 57 | 66 | 2295 |
| 57.5 | 65 | 2326 |
| 58 | 64 | 2359 |
| 58.5 | 63 | 2392 |
| 59 | 62 | 2427 |
| 59.5 | 61 | 2463 |
| 60 | 60 | 2500 |
| 60.5 | 59 | 2538 |
| 61 | 58 | 2578 |
| 61.5 | 57 | 2620 |
| 62 | 56 | 2663 |
| 62.5 | 55 | 2707 |
| 63 | 54 | 2753 |
| 63.5 | 53 | 2801 |
| 64 | 52 | 2851 |
| 64.5 | 51 | 2904 |
| 65 | 50 | 2958 |
| 65.5 | 49 | 3014 |

TABLE 2-continued

Resistive force for range of angles according to embodiments of the invention.

| Angle Θ | Angle α | Force $F_{T/C}$ (lbs.) |
|---|---|---|
| 66 | 48 | 3073 |
| 66.5 | 47 | 3135 |
| 67 | 46 | 3199 |
| 67.5 | 45 | 3266 |
| 68 | 44 | 3337 |
| 68.5 | 43 | 3411 |
| 69 | 42 | 3488 |
| 69.5 | 41 | 3569 |
| 70 | 40 | 3655 |
| 70.5 | 39 | 3745 |
| 71 | 38 | 3839 |
| 71.5 | 37 | 3939 |
| 72 | 36 | 4045 |
| 72.5 | 35 | 4157 |

Table 2 and the corresponding combination graph at FIG. 4D show that the resultant force increases in a non-linear fashion. The range of angles proposed in the '915 application massively increase the required resistive forces, negating the benefits of using an A-frame or truss foundation. The horizontal line drawn at 4000 pounds in FIG. 4D shows the range of leg angles required to limit $F_{T/C}$ to 4000 pounds or less. To stay below 4000 pounds, the leg angle θ must below 72.5 degrees and the apex angle α above 35-degrees. For apex angles below that, or truss leg angles above that, the tensile and compressive forces begin to increase sharply, which has significant cost-impacting consequences for the truss design. Therefore, the preferred apex angle range is 35-degree to 70-degrees corresponding to a leg angle below 72.5 degrees. The ideal apex angle is above 49-degrees corresponding to a leg angle below 65.5 degrees. Angles in this ranges will keep the resultant forces below 3000 pounds.

Figure 5A:
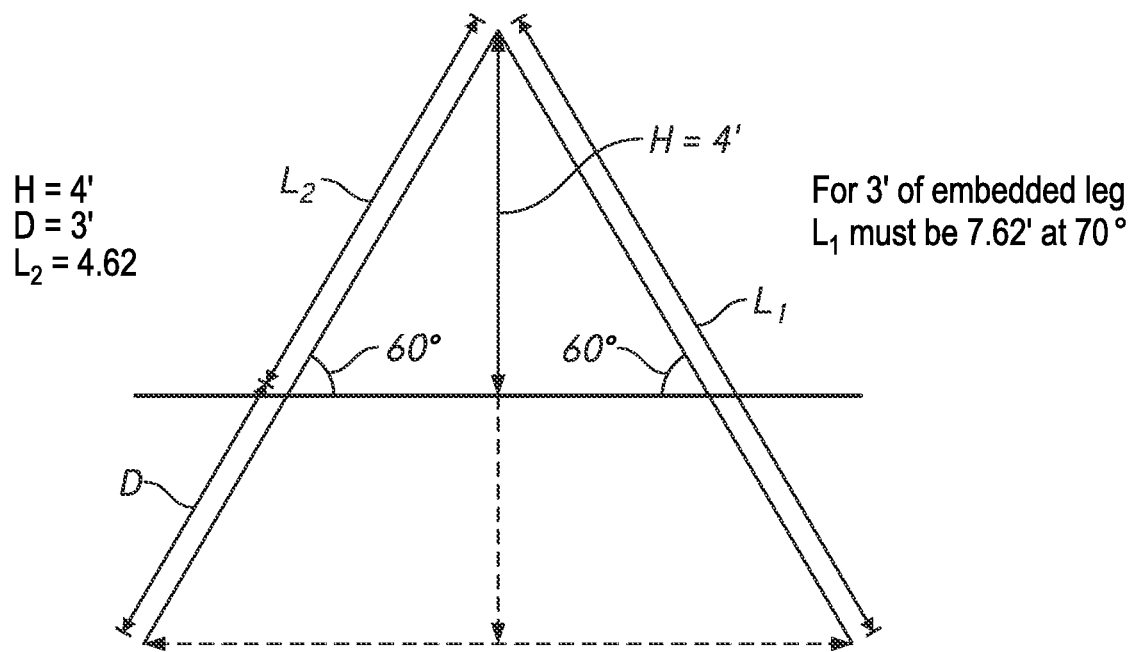
FIG. 5A is a diagram showing the correlation between truss angle and A-frame leg length at ±60-degrees.
Figure 5B:
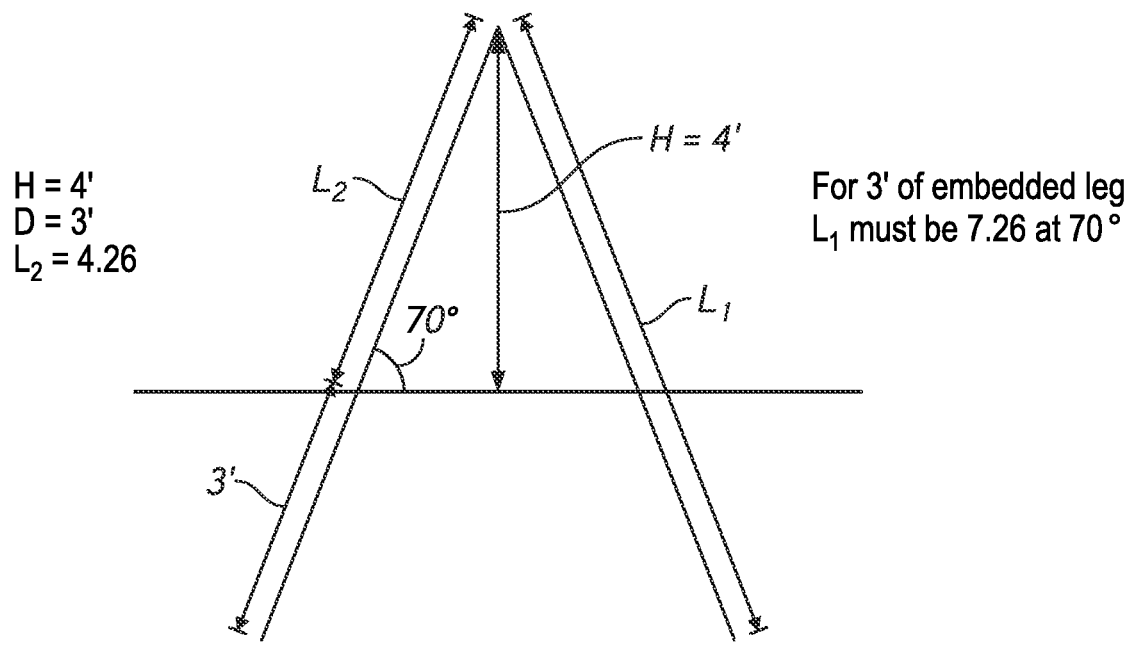
FIG. 5B is a diagram showing the correlation between truss angle and A-frame leg length at ±70-degrees.
Figure 5C:
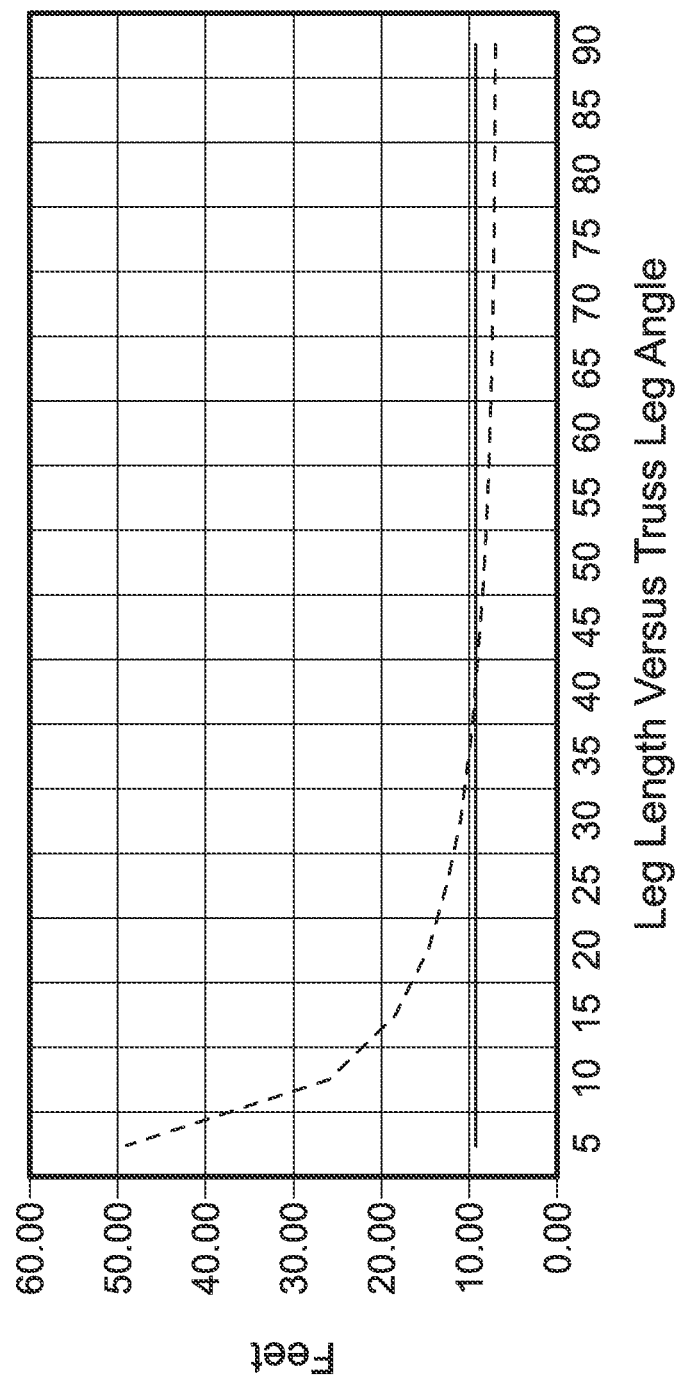
FIG. 5C is a graph showing leg length versus truss leg angle for a range of acute angles.

Another consideration in angle selection is material usage. For a given fixed depth of embedment, steeper angles will require less material. Turning to FIGS. 5A and 5B, these figures present two scenarios that seek to achieve a four-foot apex height, labeled H in the figures, and three feet of embedment for each truss leg. By setting the opposite side of the truss triangle to 4, the desired height of the apex above ground, the hypotenuse ($L_2$) may be solved for using equation (2):

$$L_2 = 4/\mathrm{Sin}(\theta) \quad (2)$$

For the 60-degree apex and truss leg angle assumption in FIG. 5A, this results in a value for $L_2$ of 4.62 feet. Adding 3 feet for the desired embedment length, requires a leg that is 7.62 feet or approximately 1935 mm long for a 60-degree truss. In FIG. 5B, the apex angle is decreased to 40-degrees and the truss leg angle increased to 70-degrees. In this case, $L_2$ drops to 4.26 feet, 4/Sin (70), resulting in a required leg length of 7.26 feet or 1844 mm. Therefore, as between the two, steeper angles allow for shorter legs to be used, reducing the amount of steel required. However, as with the required resistive forces, the rate of change of leg length with decreasing angle is not linear, and as noted above, steeper leg angles (narrower apex angles) may require greater length of embedment for each leg due to the exponentially increasing forces $F_{T/C}$. Table 3 below shows the pile length for various leg and apex angles assuming a four-foot apex height and three feet of embedded length.

TABLE 3

Leg length as a function of truss angle.

| Angle α | Angle Θ | Leg Length |
|---|---|---|
| 170 | 5 | 48.89 |
| 160 | 10 | 26.04 |
| 150 | 15 | 18.45 |
| 140 | 20 | 14.70 |
| 130 | 25 | 12.46 |
| 120 | 30 | 11.00 |
| 110 | 35 | 9.97 |
| 100 | 40 | 9.22 |
| 90 | 45 | 8.66 |
| 80 | 50 | 8.22 |
| 70 | 55 | 7.88 |
| 60 | 60 | 7.62 |
| 50 | 65 | 7.41 |
| 40 | 70 | 7.26 |
| 30 | 75 | 7.14 |
| 20 | 80 | 7.06 |
| 10 | 85 | 7.02 |
| 0 | 90 | 7.00 |

As the leg angle increases and the apex angle decreases, the leg length goes down to the minimum, the straight-line length of 7-feet where the truss becomes a monopile. As the leg angle is reduced and apex angle increased, the leg length begins to increase slightly and then takes off for angles below 40-degrees. For nearly all leg angles above 40-degrees (apex angles below 100), there is relatively little variance in the length, ≈2 feet or 29-percent above the minimum of 7-feet. For leg angles of 55-degrees of greater, apex angles of 70-degrees or less, there is less than one foot of variance, or 14-percent longer than the minimum. Therefore, the preferred leg angle from a material usage perspective is one that is at least 40-degrees and ideally 55-degrees or greater, corresponding to a preferred apex angle less than 100-degrees, and ideally less than 70-degrees.

Taken together, the information in Tables 1, 2, and 3 and FIGS. 3D, 4D, and 5D show that there are optimal ranges for α and θ that balance competing goals of minimizing $F_{T/C}$ against minimizing material usage. To the first point, the preferred apex angle α is more than 35-degrees up to 70-degrees, while the ideal range is from 55-60-degrees, corresponding to a preferred truss leg angle θ from 55 to less than 72.5-degrees, with an ideal range from 60 to 65-degrees. From a material usage perspective, any angle α below 100-degrees or angle θ above 40-degrees is acceptable but angles for a below 70-degrees and angles θ above 55-degrees are preferred. These ranges overlap with the optimal range of the apex angles α and truss leg angles θ to minimizing $F_{T/C}$.

Figure 6A:
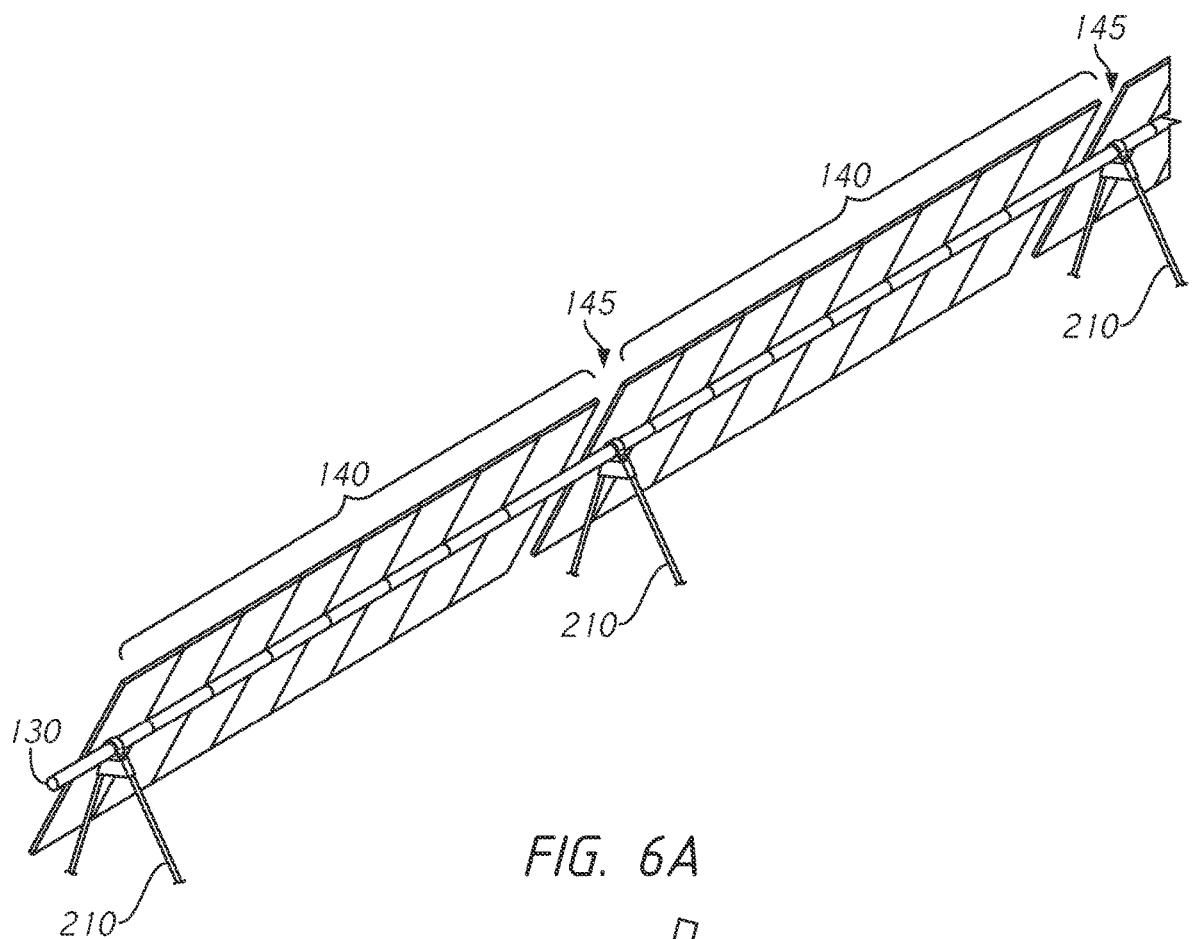
FIG. 6A is a perspective view of a portion of a single-axis tracker and A-frame foundation according to various embodiments of the invention.
Figure 6B:
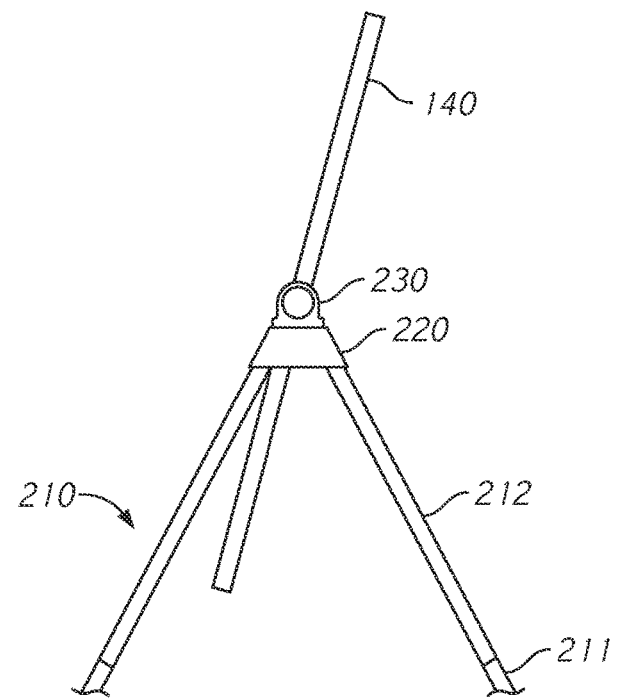
FIG. 6B is an end view of the portion of single-axis tracker and A-frame foundation shown in FIG. 6A.
Figure 7A:
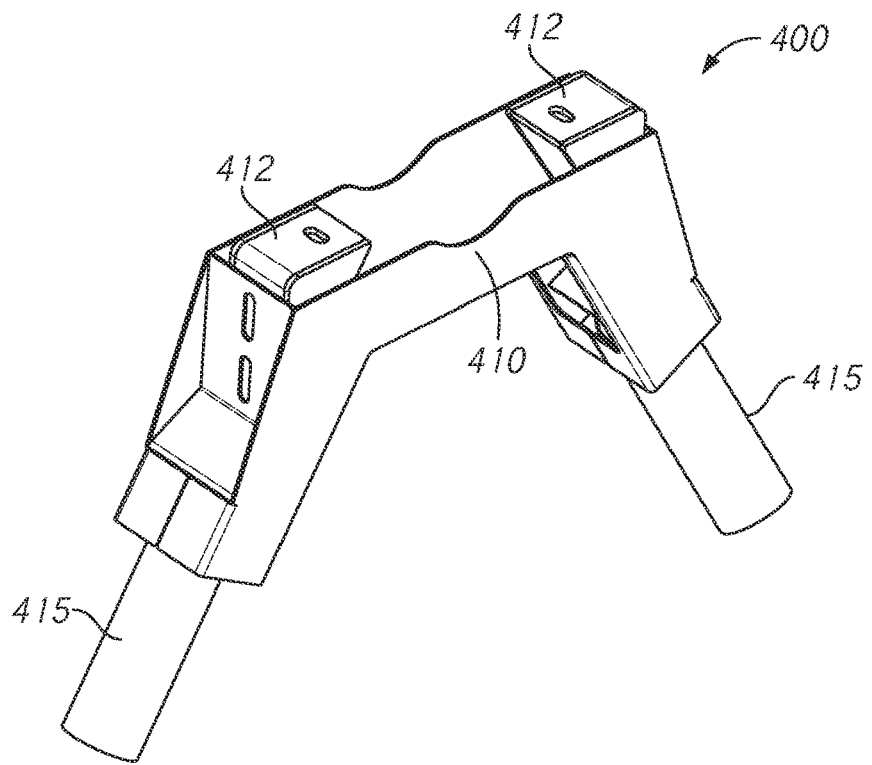
FIG. 7A is a perspective view of a further adapter for a top-down single-axis tracker that orients lateral loads at the work point of an A-frame-shaped truss foundation according to various embodiments of the invention.
Figure 7B:
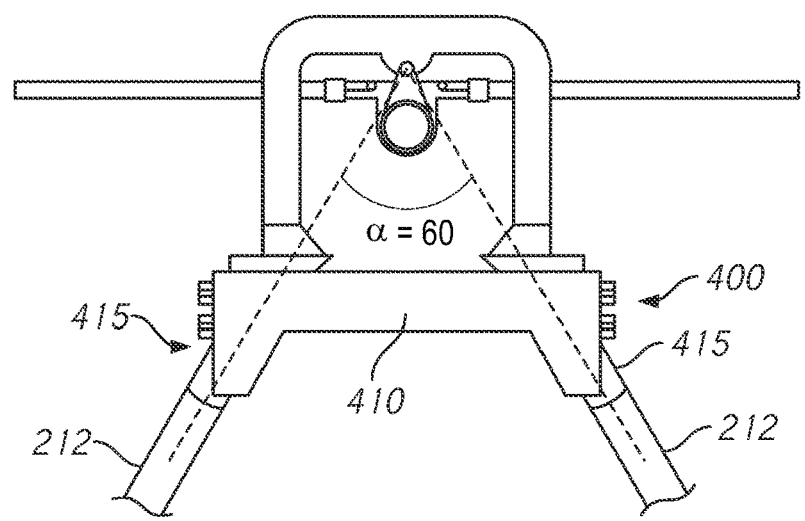
FIG. 7B is an end view of the adapter for the top-down single-axis tracker of FIG. 7A supporting a single-axis tracker.

Referring now to FIGS. 6A and 6B, these figures show a single-axis tracker array and an A-frame foundation for a single-axis tracker array or other axial solar array according to various embodiments of the invention. As discussed above in the context of FIGS. 2A and 2B, one potential disadvantage of an A-frame type foundation relative to a conventional H-pile is that as the torque tube rotates the panels into steep angles (greater than ±50 degrees), the legs of the A-frames may interfere with the panels. This could require using a smaller apex angle or steeper leg angle for the A-frame, as taught in the '915 application, but this is not optimal due to the rapidly and non-linearly increasing value of $F_{T/C}$. Another mitigation technique is to limit the range of motion for the tracker, but this too is untenable because it eliminates the ability to harvest so-called "shoulder power" obtained at the beginning and end of each day, when the sun is rising from or setting towards the horizon. Tracker manufacturers design their systems to harvest shoulder power and advertise this feature, so limiting rotation of the tracker is impractical from a business perspective.

The inventors of this disclosure have proposed a solution that overcomes this problem without limiting the torque tube's range of rotation. The solution introduces a gap, such as gap 145 shown in FIG. 6A, at each point on the torque tube above one of the A-frame foundations (e.g., at the torque tube bearing locations). Because the legs of each truss define a substantially common East-West oriented plane, the amount of spacing required is little more than the outside diameter of the legs themselves or the thickness of the bearing assembly. In this way, the torque tube can rotate through a full range of angles (up to and beyond the leg angle) and is limited only by the length of slack wire interconnecting the modules to non-rotating components. As seen, in 6B, with a 60-degree truss leg and apex angle, the torque tube can rotate the panels all the way to 70-degrees or even steeper without interference.

The remaining FIGS. 7A-B, 8, 9, and 10 show various truss adapters and bearing adapters that separate the legs by an apex angle in the desired range of more than 35-degrees up to 70-degrees according to various embodiments of the invention. Starting with FIGS. 7A-B, these figures show adapter 400 with a main body portion 410, planar bearing supports 412, and a pair of aligned connecting portions 415 extending down and away from main body portion 410 to couple to truss legs 210. The connecting portions 415 are preferably symmetric, meaning that straight lines through their respective centers will intersect at a common point. Adapter 400 could support a bottom-up or top-down style tracker. 7B shows adapter 400 attached to upper legs 212 via connecting portions 415. In various embodiments connecting portions 415 are oriented so that upper legs 212 are angled apart from each other at the apex at an angle in a range of more than 35-degrees up to 70-degrees. In various embodiments, fitment between connecting portions 415 and upper legs 212 will allow for adjustment between these structures to enable the adapter's height relative to upper legs 212 to be adjusted before permanently connecting it to upper legs 212. The dotted lines extending through the center of each leg 210 show that connecting portions 415 are aligned in the vertical direction. Though not shown, a top view would also show that the lines through their respective centers intersecting, showing that they are also horizontally aligned, i.e., intersecting at substantially the same point along the torque tube. The tracker shown in 7B is a top-down tracker, such as that shown in FIGS. 2C and D.

Figure 8:
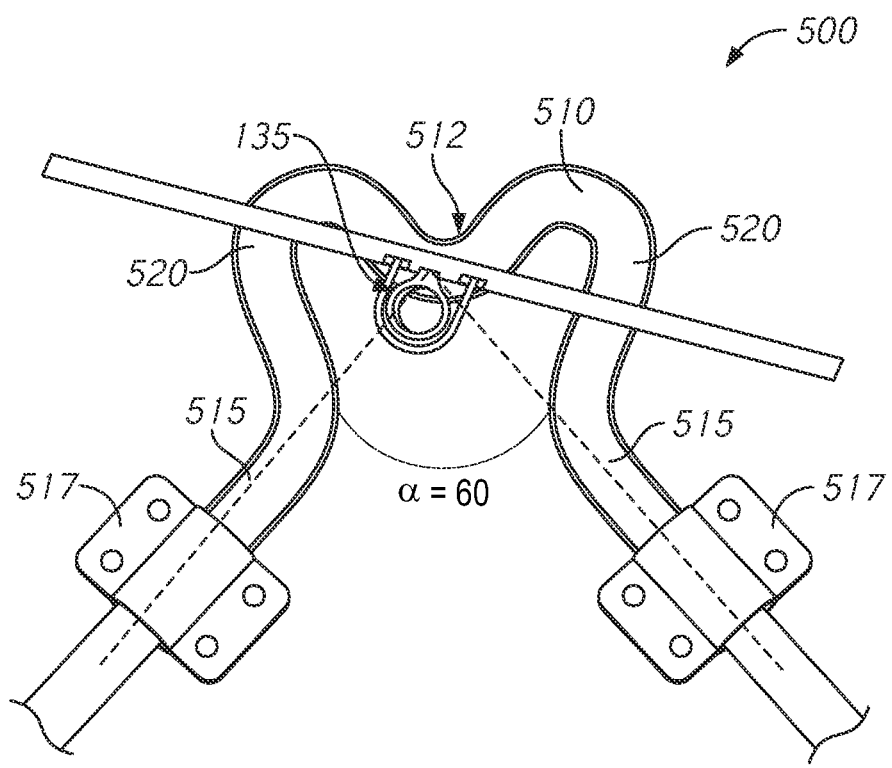
FIG. 8 is an end view of a bearing adapter supporting a top-down single-axis tracker according to various embodiments of the invention.

FIG. 8 shows cardioid-shaped bearing adapter 500 specifically adapted for a top-down single-axis tracker. As used in this disclosure and claims, the term bearing adapter is used generically to refer to structures that combine the function of an adapter, i.e., joining the legs of the A-frame so that they are aligned and at the correct angle, and the functions of a bearing assembly, i.e., supporting the torque tube as well as providing a cylindrical bearing that receives a rotational member that serves as the tracker's axis of rotation. Bearing adapters are not limited to only bottom-up or only top-down trackers, and instead may accommodate either, as is shown and discussed in greater detail below. Bearing adapter 500 of FIG. 8 performs at least three functions.

First, it unifies the adjacent legs of the A-frame to form a rigid truss structure. Second, it provides a cylindrical bearing opening for a bearing pin to hang the torque tube from and clearance for it to swing through its East-West arc while reducing the steel and components needed to do so. Finally, it aligns upper legs 212 so that their respective axes are aligned with respect to each other and the torque tube sets the apex angle between them in a range of greater than 35-degrees up to 70-degrees, and ideally in a range of 50-degrees to 60-degrees.

Bearing adapter 500 is formed from one or more cast metal pieces. It should be appreciated, however, that other manufacturing techniques may be employed without departing from the spirit or scope of the invention. It consists of cardioid-shaped hoop 510 with cusp 512 and symmetric S-shaped arms 520, located on either side of cusp 512. S-shaped arms 520 terminate in respective tubular connecting portions 517. S-shaped arms 520 project away from cusp 515, then curve back inwards before curving back out to match the angle and spacing of the truss legs (e.g., ±60-degrees). In various embodiments, the desired angle truss leg angle θ and apex angle α will be known in advance and the bearing adapter 500 will be manufactured to set that angle.

Connecting portions 517 shown in the example of these figures are drawn as partial tubes. In various embodiments, separate cover plates that are also tubular may fit over the upper legs 212 of the A-frame and mate with connecting portions 517 to capture the upper legs. Bolts, rivets, or other known mechanical fasteners and their functional equivalents may be used to secure the cover plates to connecting portions 517. It should be appreciated that other embodiments may have a complete tube at the end of each S-shaped arm 520 that is dimensioned to receive or fit inside the free ends of each adjacent upper leg 212, or a completely different geometry. Such modifications are within the scope of the various embodiments of the invention as long as they don't undermine the functions of the adapter. A cylindrical bearing opening in cusp 512 receives the bearing pin from which torque tube 130 is suspended. Module brackets 135 couple the solar panels (photovoltaic modules) to torque tube 130. Because a monopile foundation is not used, the ends of S-shaped members 520 do not need to intersect at a horizontal mounting platform. This design takes more efficient advantage of the truss architecture and may simplify installation. For example, if after each pair of adjacent truss legs is installed, the torque tube or torque tube sections may be laid on the ground between the adjacent unconnected legs. Once bearing adapters, such as adapter 500, are attached to torque tube 130 at the appropriate locations, the entire tube or tube sections can be lifted with a forklift or other equipment so that individual connections between adjacent legs and their respective bearing adapters can be completed.

Figure 9:
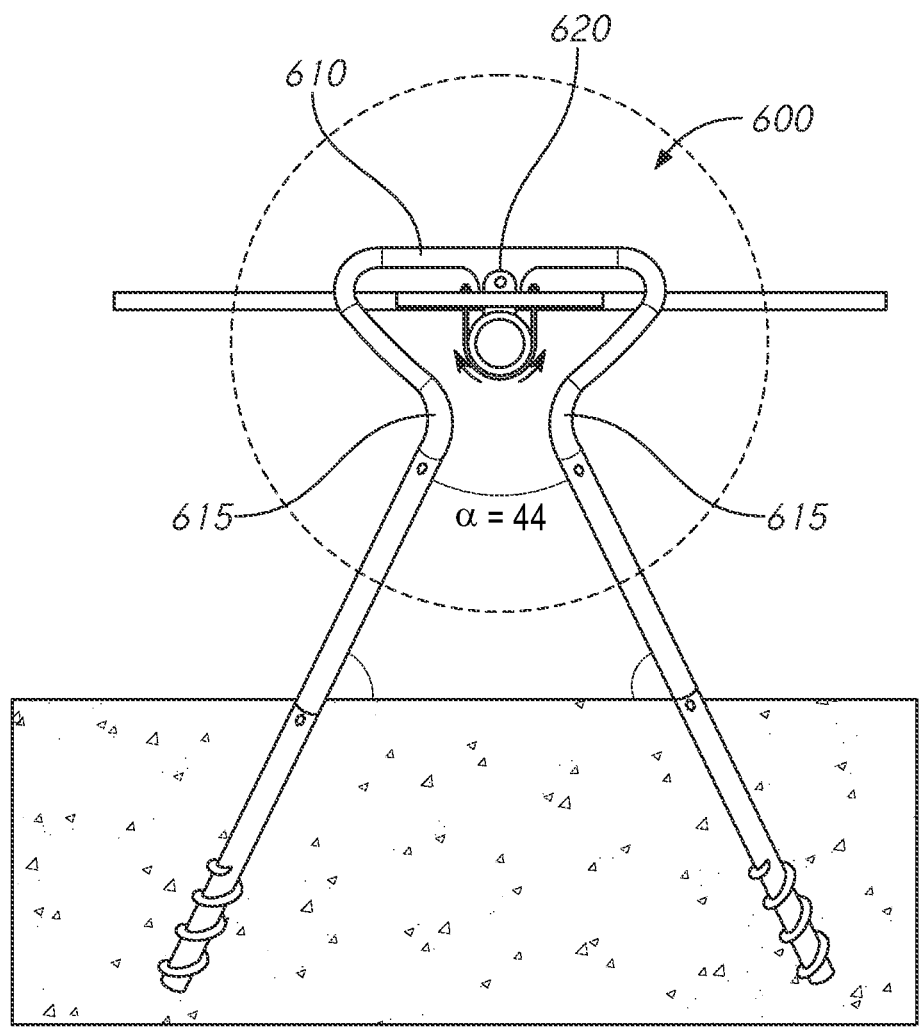
FIG. 9 is an end view of a bearing adapter supporting a top-down single-axis tracker according to various embodiments of the invention.

Turning now to FIG. 9, this figure shows an end view of a top-down single-axis tracker and bearing adapter 600 for such a tracker that joins the truss to form a A-frame foundation and aligns the legs so that they are separated from each other at the apex by an angle α in a range of more than 35-degrees up to 70-degrees, and ideally in a range of 50 to 60-degrees. The top-down tracker could be a mechanically balanced tracker system such as that available from NEXTRACKER or other a different top-down tracker from another tracker maker. Bearing adapter 600 provides the functionality of conventional torque tube clamp supports (e.g., elements 124/126 in FIGS. 2C/2D) but in a form factor optimized for truss foundations.

Starting with the foundation, as with those shown in conjunction with the other truss adapters and bearing adapters discussed herein, it consists of legs 210 each formed from screw anchors 211 and upper legs 212. Screw anchors 211 have been rotated into the underlying soil at reciprocal angles with respect to horizontal, in this example ±68-degrees so that they are separated at the top by an angle α of 44-degrees. In various embodiments, each screw anchor 211 has a thread form at its distal end to help it resist axial forces and keep it on track during driving. The thread form may be uniformly wide or may have a tapered lead-in. Upper leg 212 is axially coupled to the above-ground end of each screw anchor 211 to form a partial A-frame using one of the various joining methods discussed herein.

Bearing adapter 600 is like bearing adapter 500 of FIG. 8 but is tubular rather than cast. Connecting portions 615 are connected to respective ends of each upper leg 212 to complete the A-frame. In various embodiments, a collar, pin, coupler, crimp or their functional equivalents may be used to join the second connecting portion 615 to the second upper leg 212 after the first connecting portion 615 has been connected to the first upper leg 212. The hinge and clamp assembly holding the torque tube are supported by bearing adapter 600 via bearing pin 620 extending through the cylindrical bearing opening in bridge section 610. As in other top-down systems shown herein, the clamp assembly holds the torque tube and suspends it so that it can rotate about bearing pin 620. In addition, in this system a pair of U-bolts straddle the torque tube to pin the module support bracket to torque tube 130. Photovoltaic modules, otherwise known as solar panels, are then attached along the torque tube 130 to each module support bracket, with each bracket joining the edges of two adjacent modules. In various embodiments, the connection between bearing adapter 600 and upper legs 212 will allow for some relative height and angular adjustment. In various embodiments, installation of adapter 600 shown in FIG. 9 may be like that described in the context of bearing adapter 500 of FIG. 8.

Figure 10:
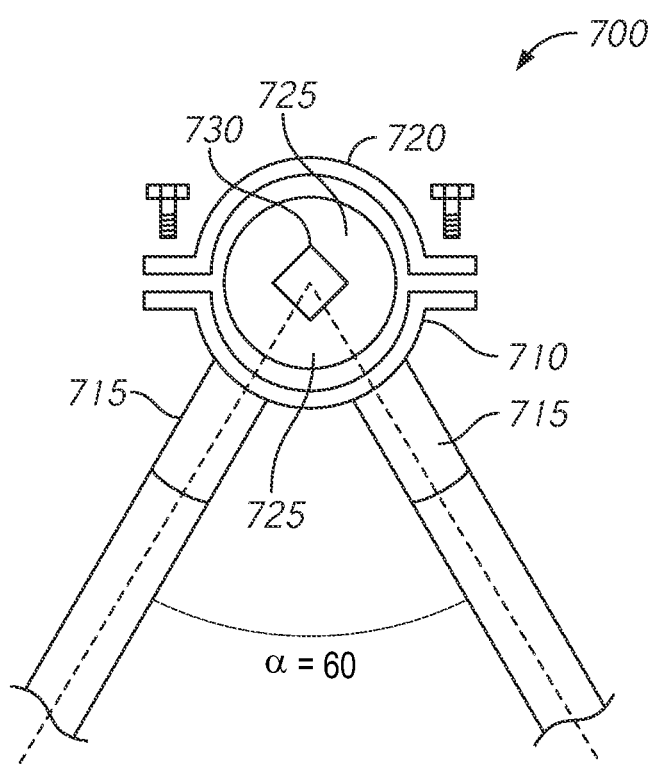
FIG. 10 is an end view of a bearing adapter supporting a bottom-up single-axis tracker according to various embodiments of the invention.

Turning now to FIG. 10, this figure shows bearing adapter 700 according to various other embodiments of the invention. Unlike the bearing adapters shown in FIGS. 8 and 9, adapter 700 is designed for a bottom-up style of single-axis tracker. Functionally it is equivalent to adapter 500/600 because it aligns and connects the truss legs to complete the A-frame, provides a cylindrical bearing for receiving a rotating member, in this case the torque tube, and sets the apex angle to the desired range. However, the geometry of adapter 700 is different because the bearing receives the torque tube rather than a hinge and therefore no clearance is required for the torque tube to swing through an arc.

Bearing adapter 700 consists of lower body portion 710 with aligned connecting portions 715 projecting down and away from lower body portion 710 to connect to upper legs 212. As with the adapters of various other embodiments, connecting portions 715 are angled down and away from lower body portion 710 so that the truss legs will be separated from each other by an angle α of more than 35-degrees to 70-degrees, and preferably at about 50 to 60-degrees. Lower body portion 710 has a semicircular cross section because it serves as the lower half of a cylindrical bearing. Upper portion 720 fits over lower body portion 710 via upper flanges that sit on corresponding lower flanges in lower body portion 710. Bolts, screws, or other known fasteners or their functional equivalents may secure upper portion 720 to lower body portion 710. In this example, torque tube 730 is shown with a boxed cross section. It is surrounded by bearing insert 725 which, translates the boxed tube to a circular cross-sectional shape to match the profile of the cylindrical bearing formed from the union of upper portion 720 and lower portion 710. Bearing adapter 700 is optimized from a material usage perspective to work with an A-frame-shaped truss foundation by joining the legs of the A-frame, keeping them at the desired angle and spacing, and aligning them with respect each other. It also provides a cylindrical bearing so that a separate bearing assembly is not needed.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A truss foundation system for single-axis trackers comprising:
   a pair of truss legs driven partially into underlying; and
   an adapter for joining the pair of truss legs to form a truss foundation with the ground, wherein the adapter comprises a main body portion, a bearing support portion above the main body portion for supporting a tracker bearing assembly, and a pair of connecting portions extending away from the main body portion for connecting to respective ones of the truss legs so that the pair of truss legs are separated by an apex angle $\alpha$, where 35-degrees $<\alpha \leq 70$-degrees.

2. The truss foundation system according to claim 1, further comprising a bearing assembly having a cylindrical bearing portion for receiving a rotating member.

3. The truss foundation system according to claim 2, wherein the bearing assembly is built into the adapter.

4. The truss foundation system according to claim 3, further comprising a bearing insert in the cylindrical bearing portion.

5. The truss foundation system according to claim 2, wherein the bearing assembly is attached to and supported by the adapter.

6. The truss foundation system according to claim 2, wherein the rotating member is a tracker torque tube.

7. The truss foundation system according to claim 2, wherein the rotating member is a bearing pin.

8. The truss foundation system according to claim 7, further comprising a torque tube suspended from the bearing pin.

9. A single-axis tracker comprising:
   a torque tube;
   a plurality of solar panels attached to the torque tube;
   a plurality of bearing assemblies supporting the torque tube;
   a plurality of plurality of truss foundations wherein each truss foundation comprises a pair of adjacent legs extending into underlying ground; and
   a plurality of adapters joining each pair of adjacent truss legs, each adapter supporting one of the bearing assemblies and having a pair of connecting portions that separate each truss leg of the pair by an apex angle $\alpha$, where 35-degrees $<\alpha \leq 70$-degrees.

10. The single-axis tracker according to claim 9, wherein the bearing assemblies and adapters are components of a single structure.

11. The single-axis tracker according to claim 9, wherein the bearing assemblies are attached to and supported by respective ones of the adapters.

12. The single-axis tracker according to claim 9, further comprising a gap between adjacent solar panels greater than a width of each adapter at least location along the torque tube supported by one of the truss foundation, the gap preventing mechanical interference between the plurality of solar panels and plurality of truss foundations.

13. The single-axis tracker according to claim 9, wherein each bearing assembly comprises a bearing supporting the torque tube so that the torque tube may rotate about its own axis.

14. The single-axis tracker according to claim 9, wherein each bearing assembly comprises a bearing supporting a bearing pin from which the torque tube is suspended.

15. An adapter for joining a pair of legs of a truss foundation system comprising:
   a bridge portion having a bearing that defines a rotational axis that is transverse to a width of the bridge portion;
   a rotating member seated in the bearing and
   a pair of connecting portions for joining the pair of legs to form a truss foundation so that the pair of truss legs are separated by an apex angle $\alpha$, where 35-degrees $<\alpha \leq 70$-degrees, wherein
   the pair of connection portions are substantially aligned about opposing sides of the rotational axis.

16. The adapter according to claim 15, wherein the rotating member comprises a bearing pin seated in the bearing.

17. The adapter according to claim 16, further comprising a section of torque tube suspended from the bearing pin.

18. The adapter according to claim 15, wherein the connecting portions extends from respective sides of the bridge portion.

* * * * *